(12) United States Patent
Kashmolah (10) Patent No.: US 11,783,396 B2
(45) Date of Patent: Oct. 10, 2023

(54) SYSTEM AND METHOD FOR REGISTERING PRODUCTS TO GENERATE SALES IN INTERNATIONAL MARKETS

(71) Applicant: Ghazi Kashmolah, Fallbrook, CA (US)

(72) Inventor: Ghazi Kashmolah, Fallbrook, CA (US)

( * ) Notice: Subject to any disclaimer, the term of this patent is extended or adjusted under 35 U.S.C. 154(b) by 129 days.

(21) Appl. No.: 16/699,538

(22) Filed: Nov. 29, 2019

(65) Prior Publication Data
US 2020/0104894 A1    Apr. 2, 2020

Related U.S. Application Data

(60) Provisional application No. 62/738,960, filed on Sep. 28, 2018.

(51) Int. Cl.
G06Q 30/00 (2023.01)
G06Q 30/0601 (2023.01)
G06Q 30/018 (2023.01)

(52) U.S. Cl.
CPC ....... *G06Q 30/0607* (2013.01); *G06Q 30/018* (2013.01); *G06Q 30/0627* (2013.01)

(58) Field of Classification Search
CPC ............. G06Q 30/0607; G06Q 30/018; G06Q 30/0627
USPC ...................................... 705/26, 27
See application file for complete search history.

(56) References Cited

U.S. PATENT DOCUMENTS

| | | | | |
|---|---|---|---|---|
| 5,862,223 A * | 1/1999 | Walker | ........... | G06Q 20/383 705/50 |
| 5,948,054 A * | 9/1999 | Nielsen | ........... | G06Q 99/00 709/200 |
| 7,167,855 B1 * | 1/2007 | Koenig | ........... | G16Z 99/00 |
| 10,395,185 B2 * | 8/2019 | Dick | ........... | G06Q 10/00 |
| 2002/0095355 A1 * | 7/2002 | Walker | ........... | G06Q 50/188 705/80 |
| 2013/0198094 A1 * | 8/2013 | Arazy | ........... | G06Q 50/18 705/317 |
| 2019/0164118 A1 * | 5/2019 | Sandberg | ........... | G06F 16/27 |
| 2019/0311421 A1 * | 10/2019 | Mossman | ........... | G06F 16/909 |
| 2020/0134551 A1 * | 4/2020 | Singh | ........... | G06Q 20/027 |

OTHER PUBLICATIONS

Luther, Don; "My Customs Broker Handles That," Torres Trade Law torrestradelaw.com, Nov. 9, 2016, Google 4pgs. (Year: 2016).*

* cited by examiner

*Primary Examiner* — Robert M Pond (57) ABSTRACT

A system and method to facilitate matching of individuals/corporations to regulatory experts is disclosed. Accordingly, the method provides a streamlined process for disclosing a product or invention, including steps of detailing input related to a product from a client device, filtering through international intellectual property experts, and collaborating with a certified expert to organize and complete necessary documentation and paperwork. The end result is a product that is appropriately prepared for distribution in a foreign country. Input related to the product may be analyzed to determine a type of the product by using a processing device. Further, the method may include receiving input from one or more expert devices related to a field of expertise of one or more regulatory experts. Input may also be analyzed to determine an appropriate expert. Furthermore, the method may include a step of transmitting notifications between the expert device and the client device.

6 Claims, 10 Drawing Sheets

SYSTEM AND METHOD FOR REGISTERING PRODUCTS TO GENERATE SALES IN INTERNATIONAL MARKETS

The current application claims a priority to the U.S. provisional patent application Ser. No. 62/738,960 filed on Sep. 28, 2018. The current application is filed on Nov. 29, 2019 while a deadline of Nov. 28, 2019 for restoring priority to the unintentionally delayed U.S. provisional application 62/738,960 was on a national holiday (Thanksgiving Day).

FIELD OF THE INVENTION

The present invention generally relates to international item regulations. More specifically, the method of registering products to generate sales in international markets relates to a system for facilitating globalization of products for sales in foreign markets.

BACKGROUND OF THE INVENTION

When individuals and/or corporations need to launch a product in a different region, they may face a significant number of problems with regards to regulations of the country. Different countries may have different rules and/or regulations related to different products. Accordingly, individuals and/or organizations may have to take an assistance from some regulatory bodies in order to be successful with their product in the country.

However, the companies may have to manually look for regulatory experts, which may waste a significant amount of time and/or resources of the company. Further, manually-located regulatory experts may not be able to provide bids to the companies and/or organizations for lack of experience or knowledge of the country regulation. What is needed is a set of improved methods and systems to facilitate matching of individuals/corporations to certified regulatory experts that overcomes the above-mentioned problems and/or limitations.

The present invention addresses these issues. According to some embodiments, a method to facilitate matching of individuals/corporations to regulatory experts is disclosed. Accordingly, the method provides a streamlined process for disclosing a product or invention, including steps of detailing input related to a product from a user device of an individual/corporation, filtering through international intellectual property experts, and collaborating with a certified expert to organize and complete necessary documentation and paperwork. The end result is a product that is appropriately prepared for distribution in a foreign country. The method may include analyzing the input related to the product to determine a type of the product by using a processing device. Further, the method may include receiving input from one or more expert devices related to a field of expertise of one or more regulatory experts using a communication device. The present invention may include analyzing input related to the field of expertise to determine an appropriate expert related to the type of product. Furthermore, the method may include a step of transmitting, using the communication device, a notification to the expert device and the user device of the individual/corporation.

DETAILED DESCRIPTION OF THE INVENTION

All illustrations of the drawings are for the purpose of describing selected versions of the present invention and are not intended to limit the scope of the present invention.

Figure 1:
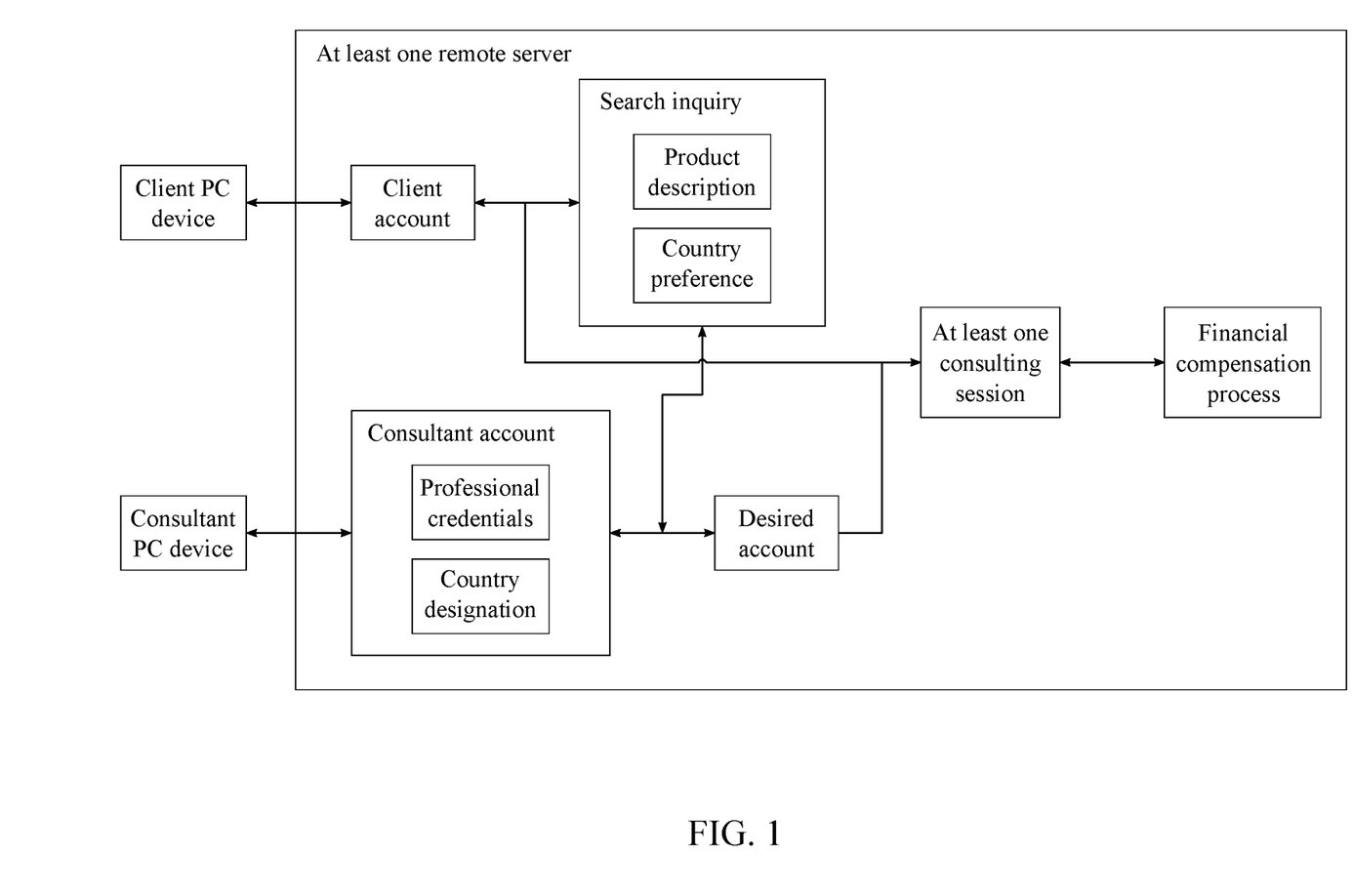
FIG. 1 is a flowchart illustrating the system of the present invention.

The present invention is a system and method of registering products to generate sales in international markets that connects producers of various products to experts in international business. The present invention accomplishes this by providing a platform which facilitates organization of information, connection of clients to business experts, and generation of necessary documentation. The system of the present invention includes at least one client account managed by at least one remote server, wherein the client account is associated with a client personal computing (PC) device (Step A), as represented in FIG. 1. The at least one client account may relate to an individual, organization, or company that is interested in obtaining international rights to market and sell products. The at least one remote server relates to a set of programmable controllers that may provide and apply system logic and connectivity between various PC devices. The at least one client PC device relates to any of desktop computers, laptop computers, smartphones, and other such devices capable of displaying information and accepting user inputs from the at least one client account. Further, a plurality of consultant accounts managed by the remote server is also provided, wherein each consultant account is associated with a corresponding consultant PC device, and wherein each consultant account includes a set of professional credentials and at least one country designation (Step B). The plurality of consultant accounts relates to a set of international business professionals available to represent various geographical regions. The plurality of consultant PC devices relates to any of desktop computers, laptop computers, smartphones, and other such devices capable of displaying information and accepting user inputs from each of the plurality of consultant accounts. The set of professional credentials may include, but is not limited to, professional certifications, business licenses, relevant experience, or a variety of alternative qualifications. The at least one country designation is a user input which enables each of the plurality of consultant accounts to select specific countries which the consultant account is qualified to represent and offer advice.

Figure 2:
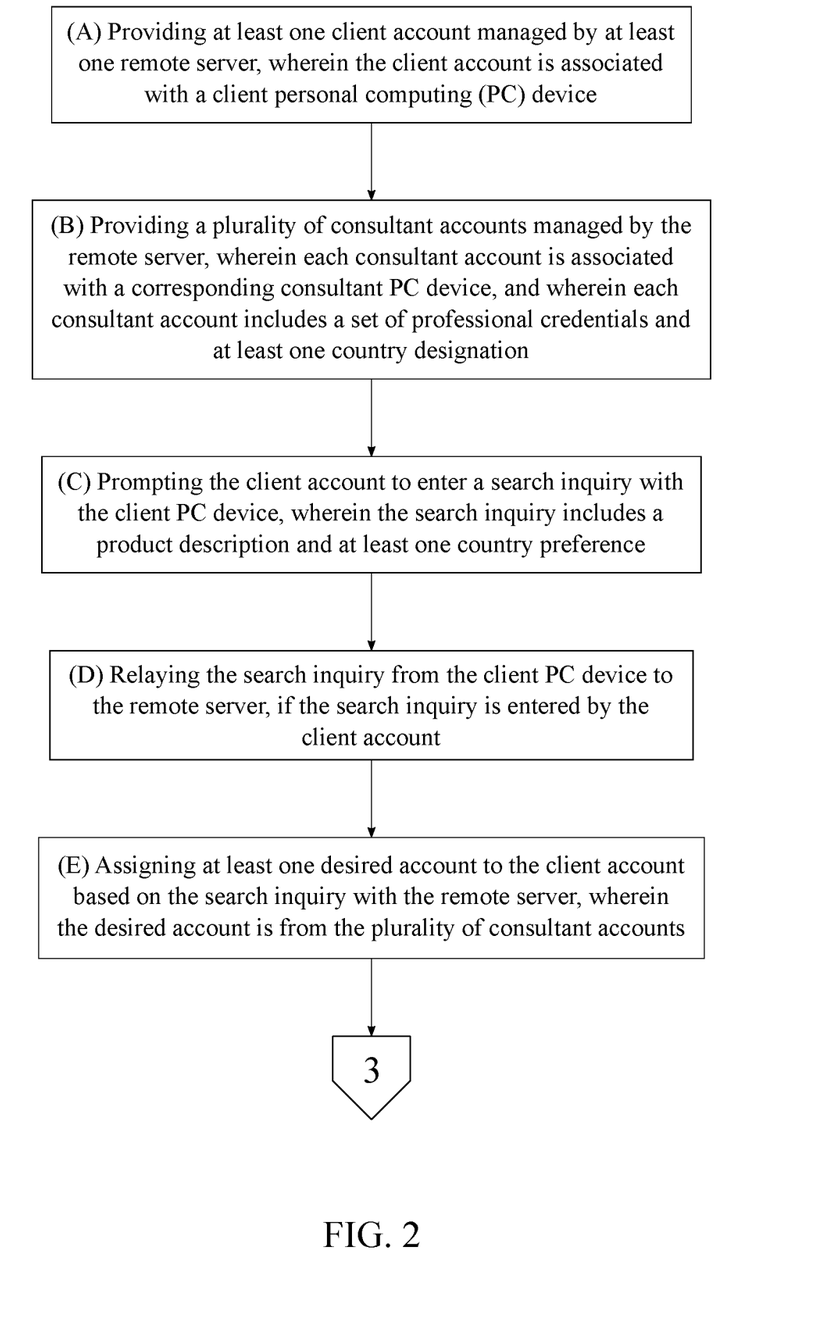
FIG. 2 is a flowchart illustrating the overall process for the method of the present invention.

The method of the present invention follows an overall process in order to address the problem of inconvenience in pursuing international sales and business ventures, as represented in FIG. 2. The client account is prompted to enter a search inquiry with the client PC device, wherein the search inquiry includes a product description and at least one country preference (Step C). The product description may include written or drawn information contained in any of a variety of data types. The at least one country preference is useful in determining the international requirements that the client account will need to pursue for a specific country. Next, the search inquiry is relayed from the client PC device to the remote server, if the search inquiry is entered by the client account (Step D). The remote server accepts the search inquiry, often storing the search inquiry in a database, enabling transmission to the plurality of consultant accounts. Next, at least one desired account is assigned to the client account based on the search inquiry with the remote server, wherein the desired account is from the plurality of consultant accounts (Step E). The at least one desired account may be selected from a variety of qualified consultant accounts, thus employing a reverse-bidding system in which a set of qualified consultant accounts may attempt to earn business from a specific client account.

Figure 3:
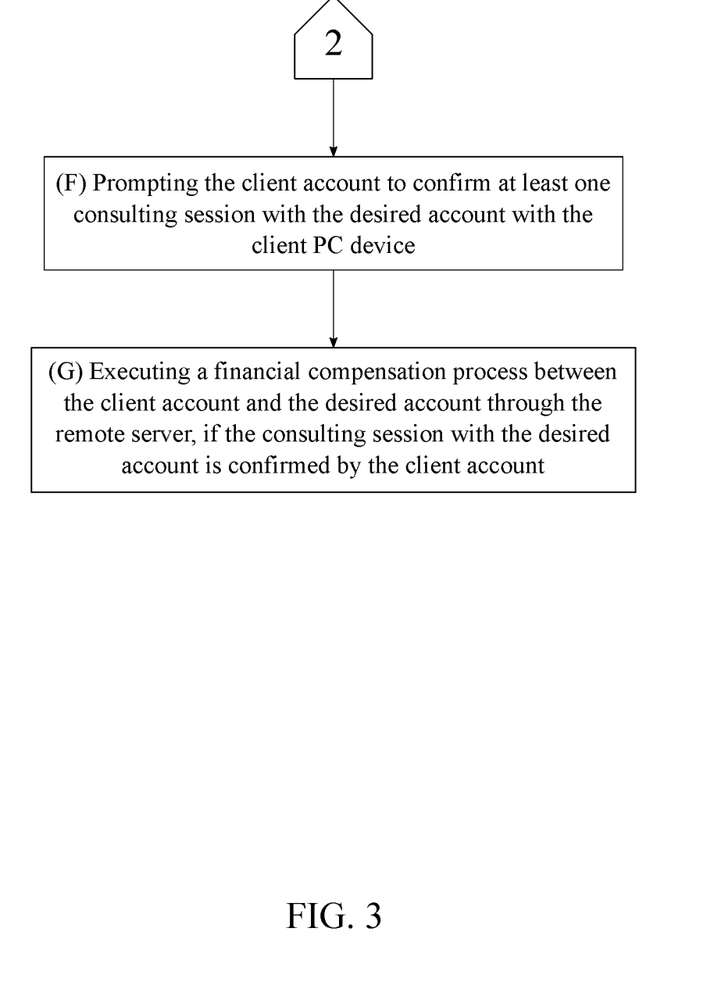
FIG. 3 is a continuation of FIG. 2.

Once the desired account is selected, productive work may be pursued and completed between the desired account and the client account. The client account is prompted to confirm at least one consulting session with the desired account with the client PC device (Step F), as represented in FIG. 3. The at least one consulting session is a discussion or meeting in which the client account may communicate any confusing details of the business or product to the desired account in order to ascertain details of what is necessary to qualify a product for international sale, and to generate any necessary documentation. Finally, a financial compensation process is executed between the client account and the desired account through the remote server, if the consulting session with the desired account is confirmed by the client account (Step G). The financial compensation process may include a variety of different payment options or patterns, either being predetermined by the desired account or applied automatically through the system of the present invention.

Figure 4:
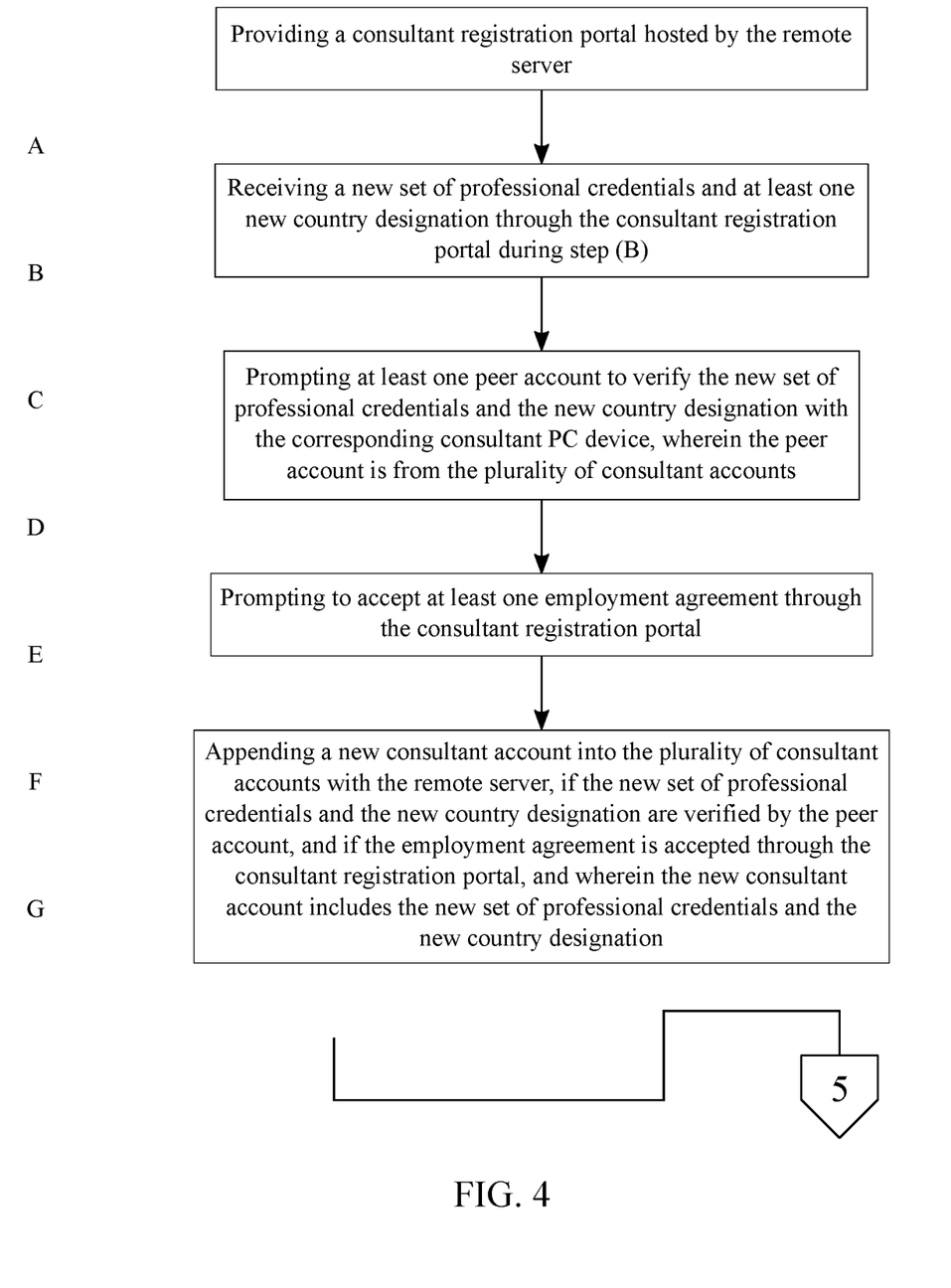
FIG. 4 is a flowchart illustrating the subprocess of adding new consultant accounts to the plurality of consultant accounts.

The outlined steps enable the connection of a client to a professional capable of assisting the client in qualifying an item or service for international business. To further assist the client account and the plurality of consultant accounts, a consultant registration portal is provided by the remote server, as represented in FIG. 4. The consultant registration portal relates to a system which provides an intuitive interface with which the plurality of consultant accounts may interact to provide relevant information about themselves. A new set of professional credentials and at least one new country designation is received through the consultant registration portal during Step B. This arrangement enables collection of the professional credentials and other relevant information for subsequent analysis in order to determine international suitability. Next, at least one peer account is prompted to verify the new set of professional credentials and the new country designation with the corresponding consultant PC device, wherein the peer account is from the plurality of consultant accounts. The verification by the peer account is a filtering system which ensures only high-quality candidates are permitted to utilize the consultant registration portal as a consultant. The consultant registration portal also prompts to accept at least one employment agreement. The at least one employment agreement may include contract details, non-disclosure agreements, or a variety of other documentation types. Finally, a new consultant account is appended into the plurality of consultant accounts with the remote server, if the new set of professional credentials and the new country designation are verified by the peer account, and if the employment agreement is accepted through the consultant registration portal, and wherein the new consultant account includes the new set of professional credentials and the new country designation. This arrangement enables new professionals to join the list of candidates qualified to interact with client accounts.

Figure 5:
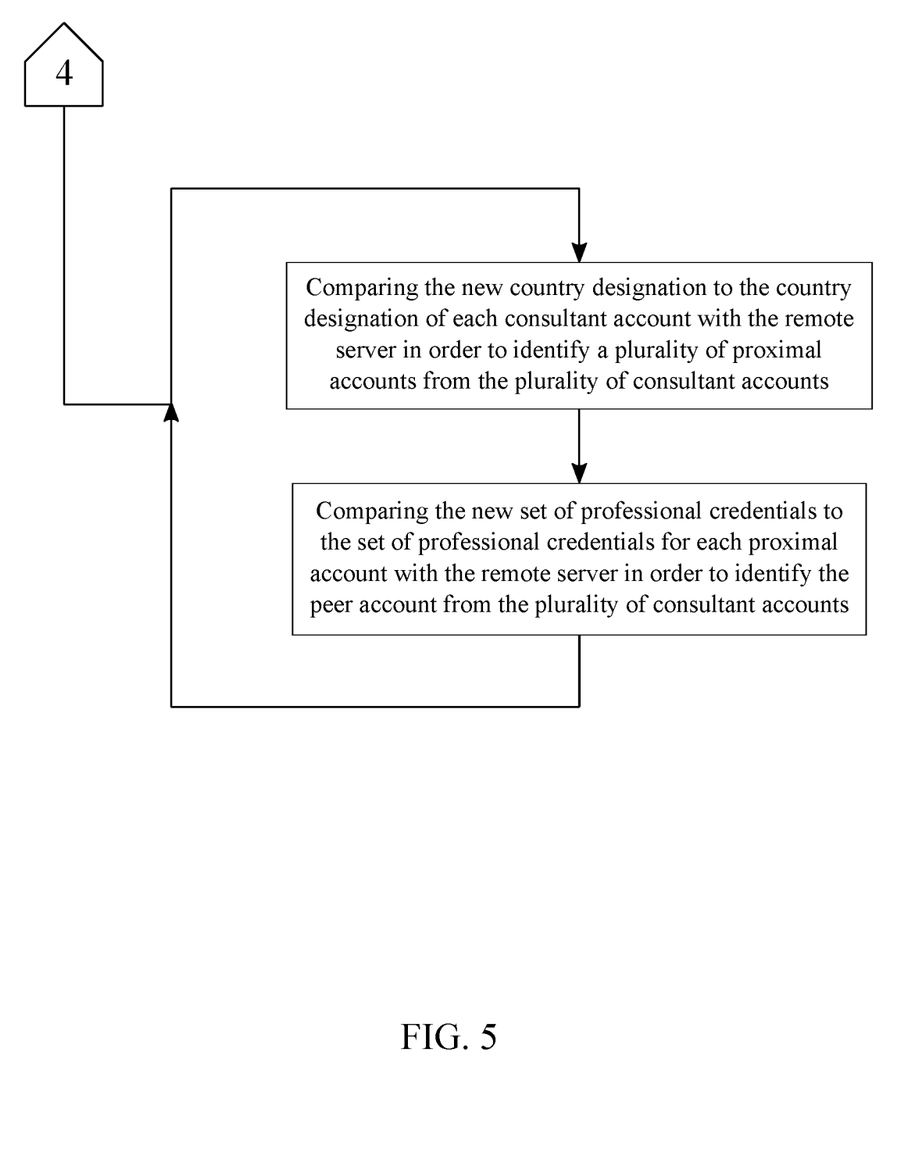
FIG. 5 is a flowchart illustrating the subprocess of determining peer accounts based on country designations.

In an exemplary embodiment, accounts may be presorted or filtered using proximity to the country of interest as a relevant criterium. To achieve this, the new country designation is compared to the country designation of each consultant account with the remote server in order to identify a plurality of proximal accounts from the plurality of consultant accounts, as represented in FIG. 5. The plurality of proximal accounts has the advantage of being able to relate and better understand the new country designation. The new set of professional credentials is then compared to the set of professional credentials for each proximal account with the remote server in order to identify the peer account from the plurality of consultant accounts. In this way, the peer account with their set of professional credentials and their country designation is able to provide a quality verification of the new country designation and the new set of professional credentials.

Figure 6:
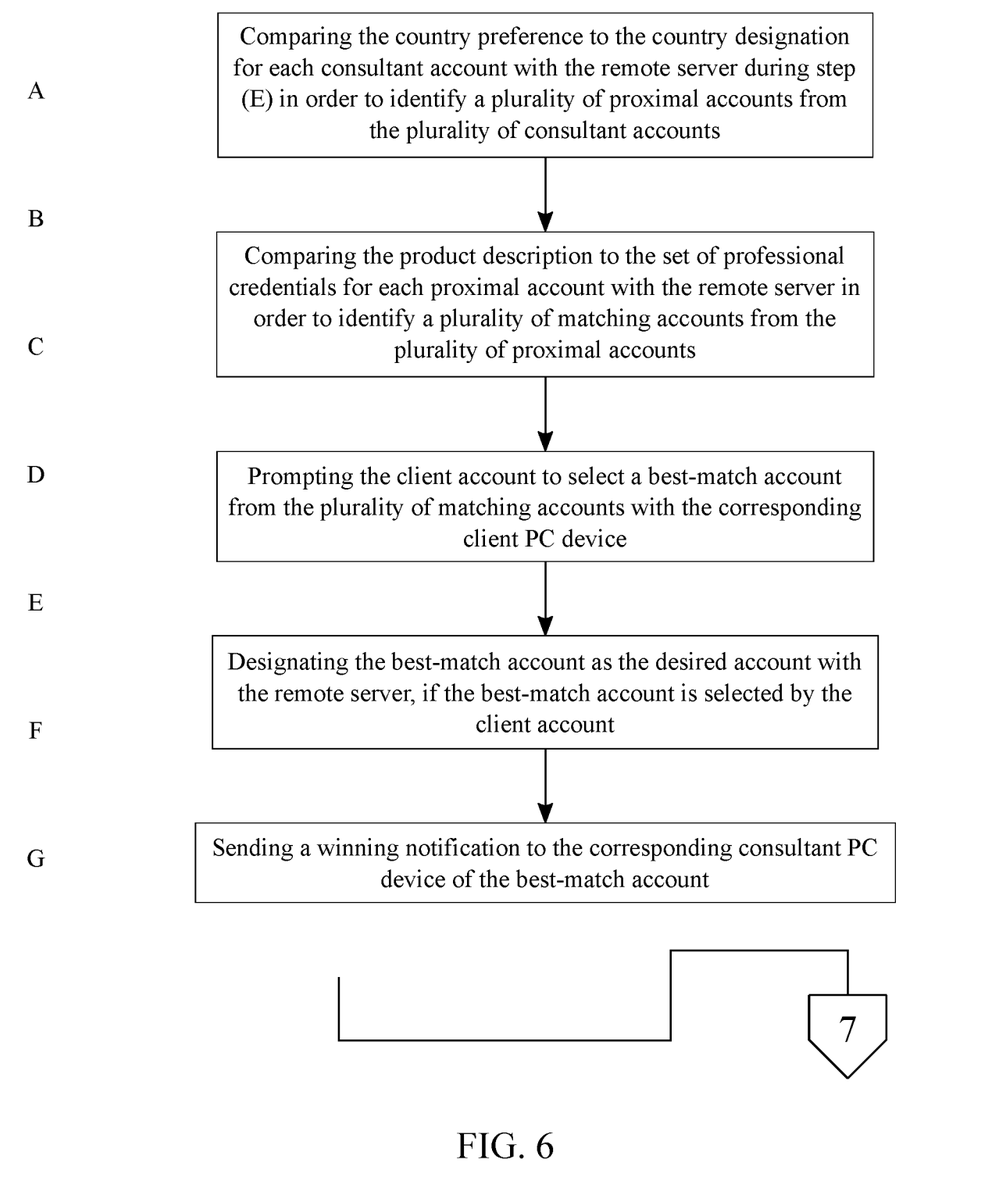
FIG. 6 is a flowchart illustrating the subprocess of selecting an appropriate consultant account.

The present invention encourages high quality consultant work by employing a reverse bidding system. To achieve this, the country preference is first compared to the country designation for each consultant account with the remote server during Step E in order to identify a plurality of proximal accounts from the plurality of consultant accounts, as represented in FIG. 6. This step enables an initial narrowing of the consultant pool into only the geospatially closest consultant accounts, which are the plurality of proximal accounts. Next, the product description is compared to the set of professional credentials for each proximal account with the remote server in order to identify a plurality of matching accounts from the plurality of proximal accounts. This step enables a subsequent narrowing of the consultant pool into only the most relevant consultant accounts, which are the plurality of matching accounts. The client account is prompted to select a best-match account from the plurality of matching accounts with the corresponding client PC device. The client account may utilize the client's own criteria, including price, location, relevant experience, history, or a variety of other criteria at the client's discretion. The best-match account is then designated as the desired account with the remote server, if the best-match account is selected by the client account. This arrangement results in the establishment of a secure connection between the best-match account and the client account, thus enabling transfer of information between the two parties. Finally, a winning notification is sent to the corresponding consultant PC device of the best-match account. This enables the best-match account to begin working with the client account.

Figure 7:
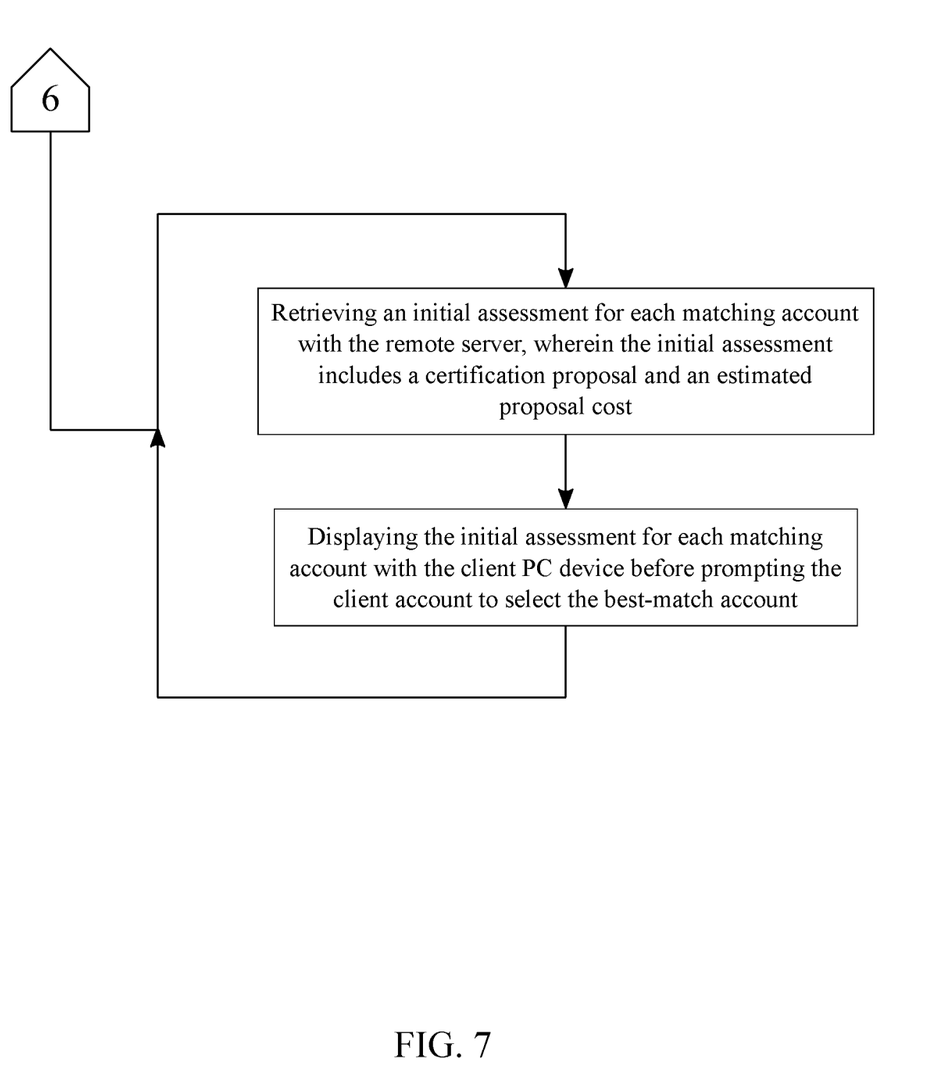
FIG. 7 is a flowchart illustrating the subprocess of providing additional information.

In an exemplary embodiment, the user may require a larger amount of information than what is provided in the professional credentials and the country designation. To increase the available information, an initial assessment for each matching account is retrieved with the remote server, wherein the initial assessment includes a certification proposal and an estimated proposal cost, as represented in FIG. 7. The estimated proposal cost relates to a cost associated with hiring the desired account, whether that is a payment plan, a flat fee, an hourly rate, or other payment methods or systems. The certification proposal may include a plan of action for obtaining specific documentation or paperwork necessary to enable legal marketing and sales of items and services in the country or countries of interest. The initial assessment for each matching account is displayed with the client PC device before prompting the client account to select the best-match account. This way, the client account has the ability to review all relevant information necessary to make an informed decision before determining the best-match account.

Figure 8:
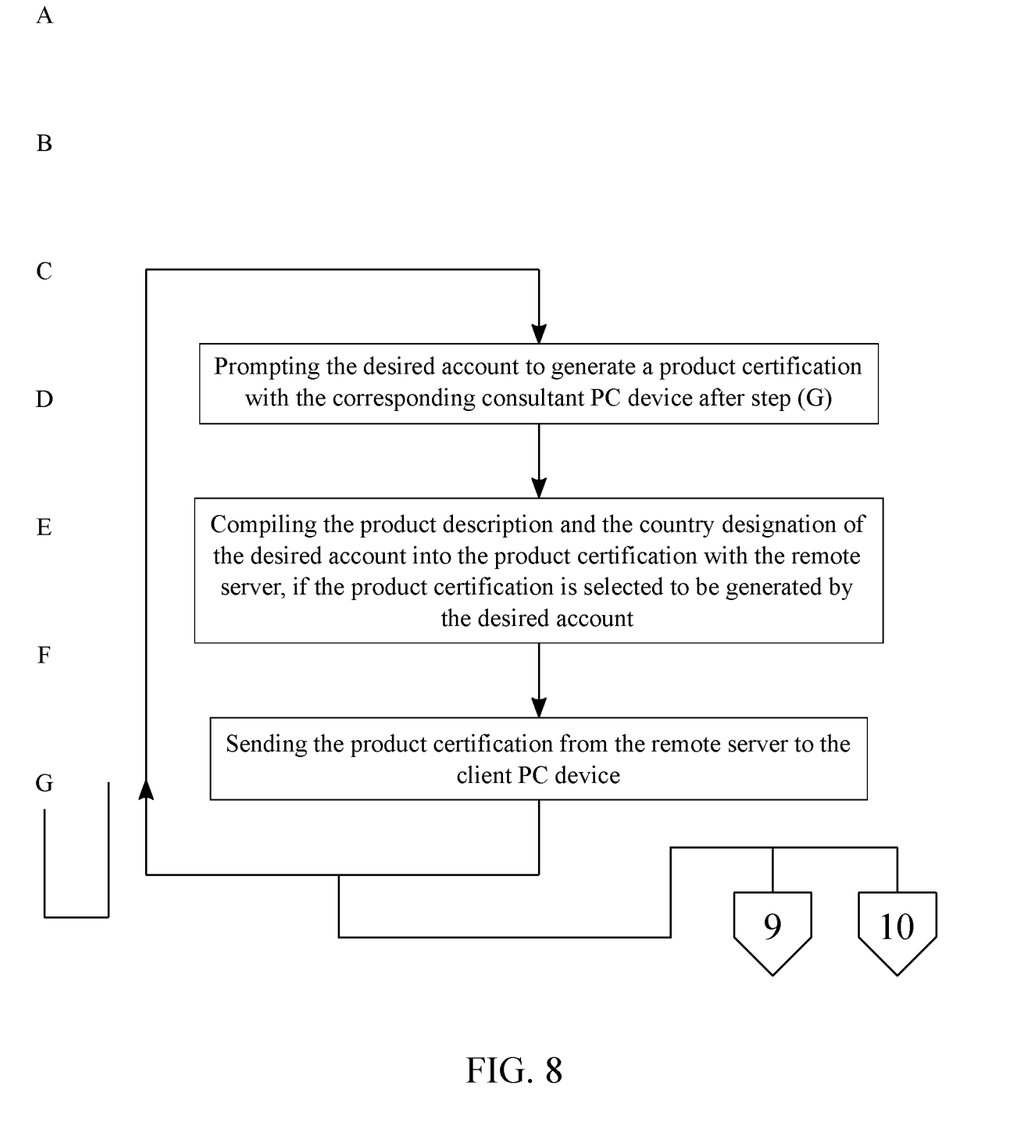
FIG. 8 is a flowchart illustrating the subprocess of generating a product certification.

Upon completion of collaborative and independent work upon the product or service, the client account requires a set of documents and deliverables that enable foreign marketing and sales. Therefore, the desired account is prompted to generate a product certification with the corresponding consultant PC device after Step G, as represented in FIG. 8. The product certification includes any and all documentation necessary to proceed with product marketing and sales. The product description and the country designation of the desired account are compiled into the product certification with the remote server, if the product certification is selected to be generated by the desired account. Thus, with approval from the client account, the product certification is prepared. Finally, the product certification is sent from the remote server to the client PC device. This provides the client account with the information desired and necessary to proceed with the foreign marketing and sales.

Figure 9:
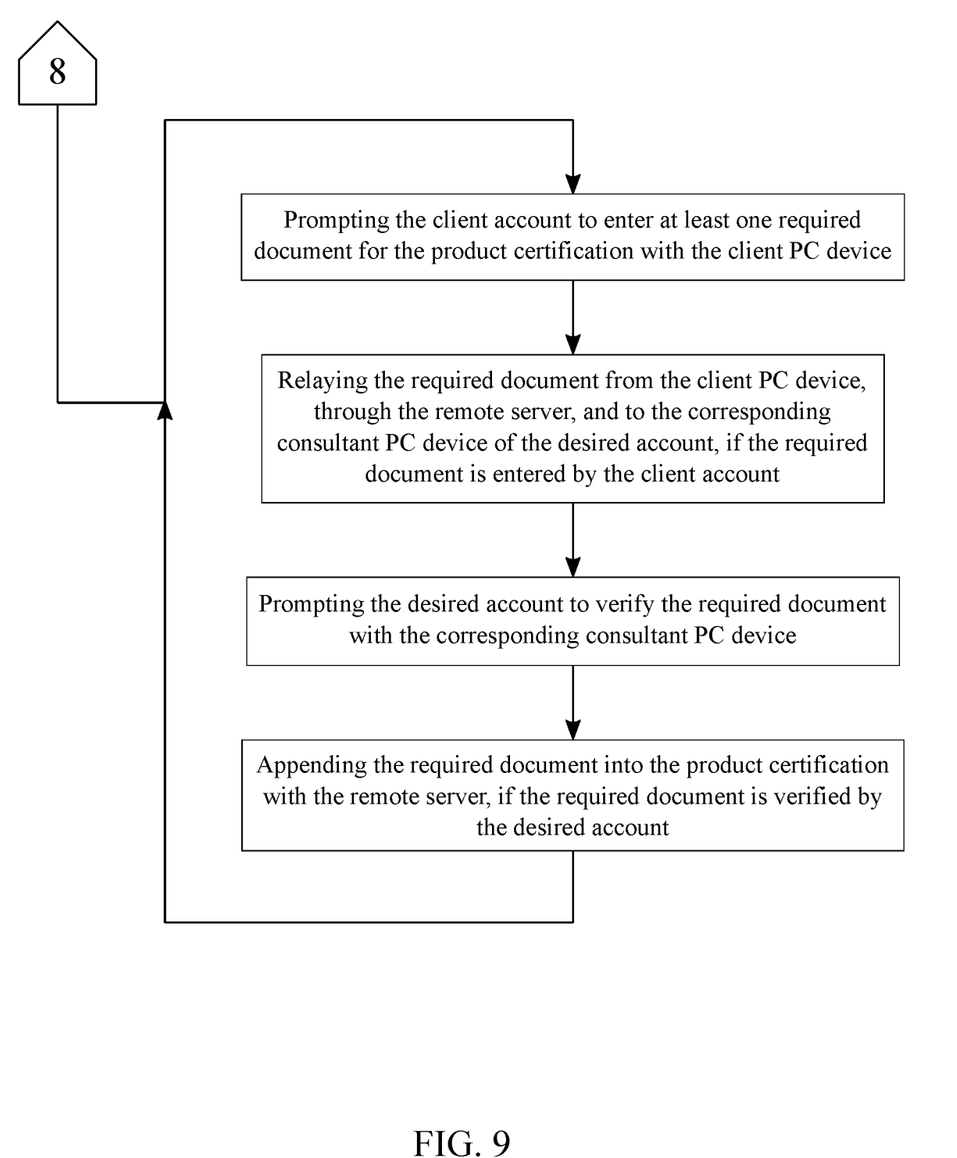
FIG. 9 is a flowchart illustrating the subprocess of providing and reviewing work before assembling the product certification.

In an exemplary embodiment, the client account works in conjunction with the desired account to develop and complete necessary paperwork. To achieve this, the client account is prompted to enter at least one required document for the product certification with the client PC device, as represented in FIG. 9. The at least one document may be any required document necessary to communicate information and documentation between the client account and the desired account. The required document is relayed from the client PC device, through the remote server, and to the corresponding consultant PC device of the desired account, if the required document is entered by the client account. This arrangement provides the desired account with access to any edits or updates to various projects or documents made by the client account for subsequent review. The desired account is prompted to verify the required document with the corresponding consultant PC device. This allows the desired account to provide insight and changes to relevant paperwork, or to approve of changes. The required document is appended into the product certification with the remote server, if the required document is verified by the desired account. This arrangement enables eventual completion of the product certification.

Figure 10:
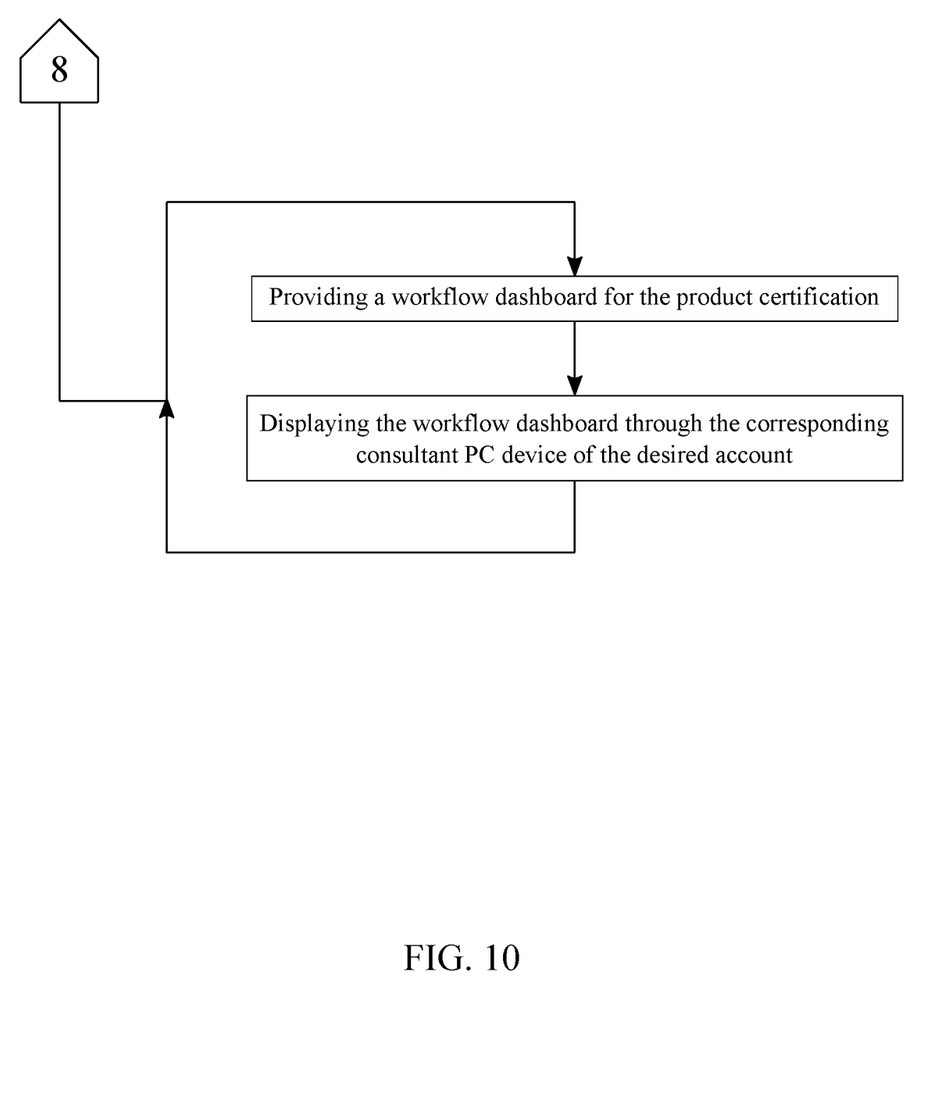
FIG. 10 is a flowchart illustrating the subprocess of providing a workflow dashboard.

In another exemplary embodiment, it may be desirable to provide an interface for managing content. To this end, a workflow dashboard is provided for the product certification, as represented in FIG. 10. The workflow dashboard enables the client account to communicate with the remote server to update data in the database that has been shared by the desired account, thereby monitoring project progress. The workflow dashboard is displayed through the corresponding consultant PC device of the desired account. This enables the client account to be made aware of delays, obstacles, successes, and other project segment updates.

Although the invention has been explained in relation to its preferred embodiment, it is to be understood that many other possible modifications and variations can be made without departing from the spirit and scope of the invention as hereinafter claimed.

What is claimed is:
1. A method of registering products to organize information, connect users, and generate documentation, comprises the steps of:
(A) providing and managing, by a remote server with the ability to provide and apply system logic and connectivity between various devices, at least one client account, wherein the client account is associated with a client personal computing (PC) device;
(B) providing and managing, by the remote server, a plurality of consultant accounts, wherein each consultant account is associated with a corresponding consultant PC device, and wherein each consultant account includes a set of professional credentials and at least one country designation, the country designation being a set of specific countries for which the consultant account is qualified to represent and offer advice;
(C) prompting entrance of a search inquiry through the client account with the client PC device, wherein the search inquiry includes a product description and at least one country preference, the product description being of a data type that enables subsequent analysis and categorization of content by the remote server;
(D) relaying, by the client PC device, the search inquiry to the remote server once the search inquiry is entered through the client account;
(E) assigning, by the remote server, at least one desired account to the client account based on the search inquiry, wherein the desired account is from the plurality of consultant accounts, wherein the assigning further comprises:
comparing, by the remote server, the country preference to the country designation for each consultant account in order to identify a plurality of proximal accounts from the plurality of consultant accounts;
comparing, by the remote server, the product description to the set of professional credentials for each proximal account in order to identify a plurality of matching accounts from the plurality of proximal accounts;
prompting automatic selection of a best-match account from the plurality of matching accounts based on client criteria through the client account with the corresponding client PC device, wherein the client criteria includes at least one of price, specific experience, case history, and location;
designating, by the remote server, the best-match account as the desired account; and
sending a winning notification to the corresponding consultant PC device of the best-match account;
(F) prompting confirmation of at least one consulting session with the desired account through the client account with the client PC device;
(G) automatically executing, by the remote server, a financial compensation process between the client account and the desired account if the consulting session with the desired account is confirmed through the client account;
(H) prompting generation of a product certification from the desired account with the corresponding consultant PC device after completion of the consulting session based on the consulting session, wherein the product certification includes documentation enabling product marketing and sales;
(I) compiling, by the remote server, the product description and the country designation of the desired account into the product certification; and

(J) sending, by the remote server, the product certification to the client PC device.

2. The method of registering products to organize information, connect users, and generate documentation, as claimed in claim 1 comprises the steps of:
providing a consultant registration portal hosted by the remote server;
receiving, at the consultant registration portal, a new set of professional credentials and at least one new country designation during step (B);
prompting verification of the new set of professional credentials and the new country designation through at least one peer account with the corresponding consultant PC device, wherein the peer account is from the plurality of consultant accounts;
prompting acceptance of at least one employment agreement through the consultant registration portal; and
appending, by the remote server, a new consultant account into the plurality of consultant accounts, if the peer account verifies the new set of professional credentials and the new country designation, and if the employment agreement is accepted through the consultant registration portal, and wherein the new consultant account includes the new set of professional credentials and the new country designation.

3. The method of registering products to organize information, connect users, and generate documentation, as claimed in claim 2 comprises the steps of:
comparing, by the remote server, the new country designation to the country designation of each consultant account in order to identify a plurality of proximal accounts from the plurality of consultant accounts; and
comparing, by the remote server, the new set of professional credentials to the set of professional credentials for each proximal account in order to identify the peer account from the plurality of consultant accounts.

4. The method of registering products to organize information, connect users, and generate documentation, as claimed in claim 1 comprises the steps of:
retrieving, by the remote server, an initial assessment for each matching account, wherein the initial assessment includes a certification proposal and an estimated proposal cost; and
displaying, by the client PC device, the initial assessment for each matching account before prompting selection of the best-match account.

5. The method of registering products to organize information, connect users, and generate documentation, as claimed in claim 1 comprises the steps of:
prompting, by the client PC device, the client account to enter at least one required document for the product certification;
relaying the required document from the client PC device, through the remote server, and to the corresponding consultant PC device of the desired account, if the required document is entered through the client account;
prompting verification of the required document through the desired account with the corresponding consultant PC device; and
appending, by the remote server, the required document into the product certification, if the required document is verified by the desired account.

6. The method of of registering products to organize information, connect users, and generate documentation as claimed in claim 1 comprises the steps of:
providing a workflow dashboard for the product certification; and
displaying the workflow dashboard through the corresponding consultant PC device of the desired account.

* * * * *